United States Patent
Kosaka et al.

(10) Patent No.: US 6,321,002 B1
(45) Date of Patent: *Nov. 20, 2001

(54) OPTICAL AMPLIFIER, OPTICAL TRANSMISSION EQUIPMENT, OPTICAL TRANSMISSION SYSTEM, AND METHOD THEREOF

(75) Inventors: Junya Kosaka; Hiroyuki Nakano; Takayuki Suzuki, all of Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/662,872

(22) Filed: Sep. 15, 2000

Related U.S. Application Data (63) Continuation of application No. 09/262,344, filed on Mar. 4, 1999, now Pat. No. 6,229,936, which is a continuation-in-part of application No. 09/129,844, filed on Aug. 6, 1998, now Pat. No. 6,195,480, and a continuation-in-part of application No. 08/432,074, filed on May 1, 1995, now Pat. No. 5,831,754.

(30) Foreign Application Priority Data

Aug. 28, 1998 (JP) ................................. 10-242877

(51) Int. Cl.⁷ ...................................... G02B 6/28
(52) U.S. Cl. ................... 385/24; 385/31; 385/46; 372/71; 359/333; 359/341
(58) Field of Search .................. 385/24, 31, 46; 372/6, 71, 703; 359/333, 341, 109, 134, 152

(56) References Cited

U.S. PATENT DOCUMENTS

| | | | |
|---|---|---|---|
| 5,375,010 | 12/1994 | Zervas et al. | 372/6 X |
| 5,430,572 | 7/1995 | DiGiovanni et al. | 359/341 |
| 6,195,480 * | 2/2001 | Kosaka et al. | 385/24 |

FOREIGN PATENT DOCUMENTS

| | | |
|---|---|---|
| 05292036 | 11/1993 | (JP) . |
| 7176817 | 7/1995 | (JP) . |
| 07297469 | 11/1995 | (JP) . |
| 08204267 | 8/1996 | (JP) . |
| 8306991 | 11/1996 | (JP) . |
| 09098136 | 4/1997 | (JP) . |
| 09138432 | 5/1997 | (JP) . |
| 10271094 | 10/1998 | (JP) . |

\* cited by examiner

*Primary Examiner*—Phan T. H. Palmer
(74) *Attorney, Agent, or Firm*—Antonelli, Terry, Stout & Kraus, LLP (57) ABSTRACT

An optical transmission equipment for use in an optical transmission system, having an optical amplifier (10A), comprising: a first optical doped fiber (1A); a second optical doped fiber (1B); a third optical doped fiber (1C); an optical isolator (6) of bringing loss in the optical signal, being provided between the first optical doped fiber and the second optical doped fiber; a dispersion compensator (7) being provided between the second optical doped fiber and the third optical doped fiber; and a pumping light source (2) being optically connected to so that the optical doped fibers (1A, 1B, 1C) are excited in common.

9 Claims, 7 Drawing Sheets

OPTICAL AMPLIFIER, OPTICAL TRANSMISSION EQUIPMENT, OPTICAL TRANSMISSION SYSTEM, AND METHOD THEREOF

This is a continuation of application Ser. No. 09/262,344 now U.S. Pat. No. 6,229,936, filed Mar. 4, 1999 which application is a continuation-in-part application of application Ser. No. 09/129,844 now U.S. Pat. No. 6,195,480, filed Aug. 6, 1998. And, U.S. Pat. No. 5,831,754 entitled "Optical Amplifier", application Ser. No. 08/432,074, filed May 1, 1995, patented on Nov. 3, 1998, and also the above application entitled "Optical Transmission Device and Optical Transmission System Employing the Same", application Ser No. 09/129,844 now U.S. Pat. No. 6,195,480, filed Aug. 6, 1998 are hereby incorporated herein by reference.

BACKGROUND OF THE INVENTION

1. Field of the Invention

The present invention relates to an optical amplifier, an optical transmission equipment, an optical transmission system, and a method thereof and in particular, to an optical amplifier, an optical transmission equipment, an optical transmission system, and a method thereof, with which can be obtained a low noise figure (N/F) as well as dispersion compensation for an optical signal therein.

2. Description of Prior Art

In general, it is already known that an input loss of an optical signal at a stage in front of a doped fiber causes deterioration in a S/N ratio thereof, in particular in an optical amplifier using such the doped fiber therein. However, as is described in "Optical Amplifier and Applications thereof" (published by Ohm Co. Ltd., May, 1992) 5-3[1], it is indispensable to insert an optical isolator at the front stage of the doped fiber in the conventional optical transmission equipment, for the purpose of suppressing the reflection of stimulated or induced emission (i.e., ASE: amplified spontaneous emission) light. In the optical transmission equipment with such the construction thereof, however, optical parts necessitated to be inserted at the front stage of the doped fiber are not only the optical isolator. Namely, in general, they also includes optical parts, including a wavelength divider for wavelength of a supervising light, a coupler for monitoring strength of a transmission signal, a multiplexer for multiplexing an pumping or stimulation light, etc., and they have respective losses therein. For instance, for obtaining a gain from 25 dB to 35 dB, it is necessary to combine a semiconductor laser of about 100 mW for excitation and a doped fiber of length from 20 m to 30 m, and in that case, noise figure (i.e., noise index; being abbreviated as NF hereinafter) of the doped fiber cannot be neglected.

In the optical transmission equipment with such the construction, the optical signal which is once damaged or receive losses therein on a transmission path or line is amplified by using the doped fiber having high NF, after being further damaged or lost thereon, therefore it is difficult to keep the NF less than 6 dB, which can be defined by a ratio between the S/N ratio of an input side and that of an output side.

Further, in a case where an optical signal of high velocity is applied onto an optical path of ordinal transmission fiber (NDSF: Non-Dispersion Shifted Fiber), there is a necessity of inserting a device for compensating the dispersion. As the result of this, there is caused another necessity for compensating the loss due to that device for the dispersion compensating.

An example of the structure of such the optical amplifier of conventional art is disclosed in a publication, "Trial of 2×2 Bi-directional Relay Optical Fiber Amplifier (BDLA)" (1997 Society Conference of Electronic Information Communication Society, B-10-184), with which the NF can be suppressed at 7.5 dB. Furthermore, a structural example is disclosed for example in U.S. Pat. No. 5,831,754 (Japanese Patent Laying-Open No. Hei 7-301831 (1995)), for compensating the loss due to the disperse compensating device.

In case of transmitting the optical signal by multiple relays or repeaters with use of k optical amplifiers, the deterioration amount in the S/N ratio rises up in proportional to the number of the stages k. Therefore, in an actual optical transmission system where there is an upper limit in total amount of the S/N ratio deterioration, the number of the relay or repeater stages must be lessened following the increase in the S/N deterioration amount of the optical amplifier. As a result of this, the distance of the optical transmission must be shortened.

For instance, under regulation of total amount of the S/N deterioration ratio to be equal to or less than 12 dB, if an optical amplifier of S/N ratio deterioration at 4 dB and an optical amplifier of S/N ratio deterioration at 6 dB are positioned at a distance 80 km, respectively, then the total S/N ratio deterioration amount comes to be 12 dB for the transmission path relayed or amplified with three (3) stages of the optical amplifiers of 4 dB, while the same total S/N ratio deterioration amount of 12 dB is obtained by relaying with two (2) stages of the optical amplifiers of 6 dB. Namely, the optical signal can be transmitted at the distance 240 km with the optical amplifiers of 4 dB in S/N ratio deterioration since it can be relayed at three (3) stages therewith, while it can be transmitted only at the distance 160 km with the optical amplifiers of 6 dB since it can be relayed at only two (2) stages therewith.

Though the S/N deterioration amount is not one being corresponding to the NF one by one, however, it becomes large when the optical amplifier inferior in the NF is applied to, therefore there is a problem that a distance for regenerative relaying or repeating comes to be short, in which the optical signal is returned once into an electric signal to be relayed or repeated.

Furthermore, with the optical amplifier in which the doped fiber is divided into a plurality of stages, a plurality of exciting or pumping light sources are necessary, therefore bringing about a rise-up of cost of the optical amplifier, as well as the large-sizing and increase in electric power consumption thereof.

SUMMARY OF THE INVENTION

Accordingly, a first object of the present invention is, for dissolving such the problems as mentioned in the above, to provide an optical amplifier including a function of compensating such the dispersion with a low NF, and being economical with a low electric power consumption.

A second object of the present invention is to provide an optical transmission equipment including a function of compensating such the dispersion with a low NF, and being economical with a low electric power consumption therewith.

A third object of the present invention is also to provide an optical transmission system including a function of compensating such the dispersion with a low NF, and being economical with a low electric power consumption therewith.

A fourth object of the present invention is to provide a method for amplifying an optical signal, including a function of compensating such the dispersion with a low NF, and being economical with a low electric power consumption therewith.

According to the present invention, for dissolving the problems and for achieving the objects mentioned in the above, there is provided an optical amplifier, for use in an optical transmission equipment, comprising:

a first optical doped fiber;
a second optical doped fiber;
a third optical doped fiber;
an optical part of bringing loss in the optical signal, and being provided between said first optical doped fiber and said second optical doped fiber;
a dispersion compensator being provided between said second optical doped fiber and said third optical doped fiber ; and
a pumping light source for pumping being optically connected to so that at least two optical doped fibers are excited in common among said first, second and third optical doped fibers.

With such the construction mentioned above, the feeble optical signal which is weakened on the transmission path(s) due to the propagation thereof is amplified once before being damaged with the loss of the optical part, such as the optical isolator, etc., without deterioration in the NF thereof, while the first, second and third optical doped fibers for amplifying thereof are pumped or excited in common, thereby achieving an optical amplifier being economical and small-sized with a low electric power consumption.

Further, according to the present invention, for achieving the objects mentioned in the above, there is provided an optical transmission equipment for transmitting optical signal from an equipment in upper stream to an equipment of down stream, comprising:

an optical amplifier portion for amplifying the transmitted optical signal for transmission thereof; and
a supervisor/controller portion for receiving information from the equipment in upper stream and for sending information including that of the optical transmission equipment itself to the equipment of down stream, wherein said optical amplifier portion comprises:
a first optical doped fiber;
a second optical doped fiber;
a third optical doped fiber;
an optical part of bringing loss in the optical signal, and being provided between said first optical doped fiber and said second optical doped fiber;
a dispersion compensator being provided between said second optical doped fiber and said third optical doped fiber; and
an pumping light source for pumping at least two optical doped fibers in common among said first, second and third optical doped fibers.

With such the construction mentioned above, the feeble optical signal which is weakened on the transmission path(s) due to the propagation thereof is amplified once before being damaged with the loss of the optical part, such as the optical isolator, etc., without deterioration in the NF thereof, while the first, second and third optical doped fibers for amplifying thereof are pumped or excited in common, thereby achieving an optical transmission equipment being economical and small-sized with a low electric power consumption.

Further, according to the present invention, also for achieving the above-mentioned object, there is provided an optical transmission system for transmitting an optical signal, comprising:

an optical sender for sending an optical signal converted from an electric signal onto a transmission path;
an optical transmission equipment for receiving the optical signal being attenuated on said transmission path, and for compensating with dispersion by amplification thereof; and
an optical receiver for the optical signal from said optical transmission equipment so as to convert it into the electric signal, wherein, said optical transmission equipment comprises an optical amplifier portion comprising:
a first optical doped fiber;
a second optical doped fiber;
a third optical doped fiber;
an optical part of bringing loss in the optical signal, and being provided between said first optical doped fiber and said second optical doped fiber;
a dispersion compensator being provided between said second optical doped fiber and said third optical doped fiber; and
an pumping light source for pumping at least two optical doped fibers in common among said first, second and third optical doped fibers.

With such the construction mentioned above, also, the feeble optical signal which is weakened on the transmission path(s) due to the propagation thereof is amplified once before being damaged with the loss of the optical part, such as the optical isolator, etc., without deterioration in the NF thereof, while the first, second and third optical doped fibers for amplifying thereof are pumped or excited in common, thereby achieving an optical transmission system being economical and small-sized with a low electric power consumption.

Furthermore, according to the present invention, for achieving the above-mentioned object, there is also provided an optical transmission system, comprising:

a plurality of optical senders, each for sending an optical signal of one wavelength converted from a plurality of electric signal onto a transmission path;
a first transponder for inputting said optical signal of one wavelength to convert into a plurality of optical signals being different to one another in the wavelength thereof;
a wavelength multiplexer for multiplexing said plurality of optical signals different to one another in the wavelength;
an optical amplifier for amplifying said multiplexed optical signals;
a wavelength divider for dividing said multiplexed optical signals amplified into the plurality of optical signals different to one another in the wavelength;
a second transponder for receiving said the plurality of optical signals different to one another in the wavelength to convert into an optical signal of one wavelength;
a plurality of an optical receivers, each for converting said optical signal of one wavelength into an electric signal, and further providing:
a supervisor/controller portion at sender side; and
a supervisor/controller portion at receiver side, wherein said optical amplifier has noise figure (NF) being equal or less than 4.5 dB.

With such the construction mentioned above, also, the feeble optical signal which is weakened on the transmission path(s) due to the propagation thereof is amplified once before being damaged with the loss of the optical part, such as the optical isolator, etc., without deterioration in the NF thereof, while the first, second and third optical doped fibers for amplifying thereof are pumped or excited in common, thereby achieving an optical transmission system being economical and small-sized with a low electric power consumption.

And, also according to the present invention, there is also provided a method for amplifying an optical signal between two transmission paths, comprising following steps:

receiving the optical signal from one of said two transmission paths;

optically amplifying the optical signal with a first amplification factor, by means of a first optical doped fiber;

optically suppressing reflection of light due to ASE;

optically amplifying the optical signal with a second amplification factor being higher than the first amplification factor, by means of a second optical doped fiber; and optically amplifying the optical signal with a third amplification factor, by means of a third optical doped fiber, so as to be transmitted to the other one of said two transmission paths, wherein at least two are pumped in common among said first, second and third optical doped fibers.

With such the method mentioned above, also, the feeble optical signal which is weakened on the transmission path(s) due to the propagation thereof is amplified once before being damaged with the loss of the optical part, such as the optical isolator, etc., without deterioration in the NF thereof, while the first, second and third optical doped fibers for amplifying thereof are pumped or excited in common, thereby achieving an optical transmission, economically, with a small-sized construction and a low electric power consumption.

DETAILED DESCRIPTION OF PREFERRED EMBODIMENTS

Hereinafter, embodiments according to the present invention will be fully explained by referring to the attached drawings.

An optical amplifier, as a first embodiment according to the present invention, and an optical transmission equipment, as a second embodiment thereof, will be explained by referring to FIGS. 1 through 3.

Figure 1:
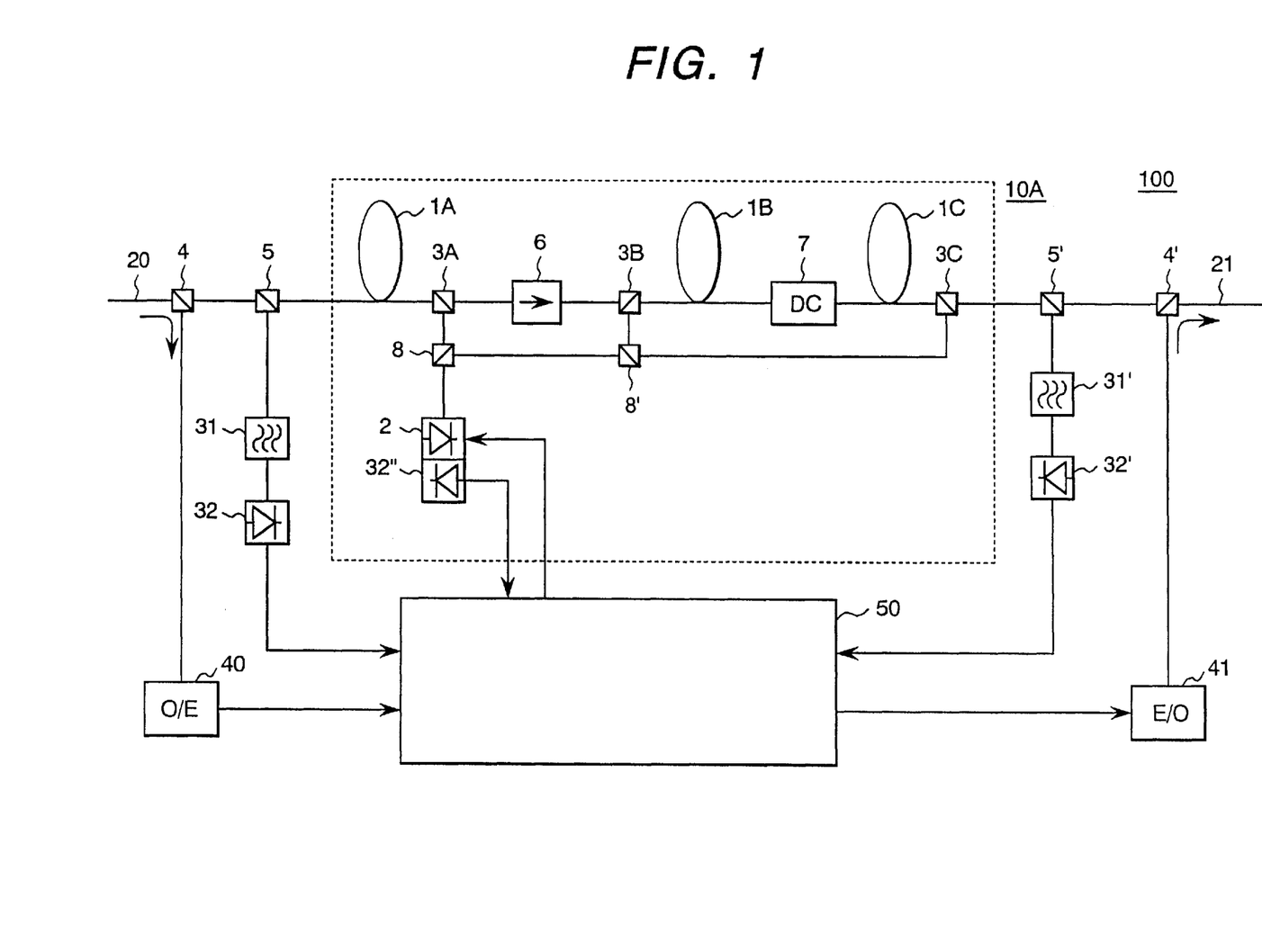
FIG. 1 is a function block diagram of showing an optical transmission equipment for use as a repeater, according to a first and second embodiments of the present invention.

Referring to FIG. 1 showing the block diagram of the optical transmission equipment 100 for use as a relay or repeater, a main optical signal and an optical supervising signal, which are multiplexed in the wavelength thereof and are transmitted on a transmission path 20 at an upper stream side (at the left-hand side in the figure) by wave-multiplexing, are inputted into a wavelength divider 4, in which the supervising signal is divided from main signal. The divided supervising signal is converted or exchanged into an electric signal at an O/E (optic/electric) converter portion 40. While, the main signal passes through the wavelength divider 4, and reaches to a 95:5 coupler 5 having a function of coupling the optical signal at a ratio 95:5. Namely, through the 95:5 coupler 5, a large portion (i.e., at the ratio 95) of the main signal is transferred to an optical amplifier 10A (indicated by a rectangular of dotted line in the figure) to be amplified therewith, on the other hand, a small portion thereof (i.e., at the ratio 5) is to a light detector 32 through a narrow band optical filter 31. Therefore, the small portion of the main signal is selected with a specific wavelength through the narrow band optical filter 31, and is converted or exchanged by the light detector 32 into an electric signal as indicating the incident light strength thereof. In this embodiment, the narrow band optical filter 31 is provided since it is assumed that the main signal is one which is multiplexed in the wavelength, however, it is needless to say that the narrow band optical filter 31 is not necessary if the main signal is of a single wavelength.

Also with the main signal which has been amplified in the optical amplifier 10A (i.e., at the right-hand side in the figure), a small portion (i.e., at the ratio 5) of it is transferred through an another 95:5 coupler 5' and an another narrow band optical filter 31' into a light detector 32' so as to be converted into the electric signal as indicating the incident light strength thereof. While, in a 95:5 coupler 4', on the contrary to the above, the main signal which has been amplified is multiplexed with the supervising signal again, which is converted into an optical signal by an E/O (electric/optic) conversion portion 41, so as to be further transmitted to a transmission path 21 at a down stream side (at the right-hand side in the figure).

The optical amplifier 10A includes a doped fiber portion 1 of three (3) stages of doped fibers 1A, 1B and 1C, each being dopes with rear earth, an pumping light source 2 with a light detector 32" thereof, an optical isolator 6, a dispersion compensator 7, and a plurality of wavelength multiplexers 3A, 3B and 3C, and a plurality of optical couplers 8, 8', as well. In the construction, an pumping light from the pumping light source 2 is divided by the optical coupler 8 at the ratio 8:2 (i.e., a 8:2 coupler 8), and then a small portion of the pumping light divided at the ratio 2 is introduced through the wavelength multiplexer 3A into the doped fibers 1A for pumping thereof. While, the large portion of the pumping light divided at the ratio 8 is further divided into two portion at the ratio 1:1 by the optical coupler (i.e., a 1:1 coupler) 8', and they are introduced through the wavelength multiplexers 3B and 3C into the doped fibers 1B and 1C, respectively, also for pumping thereof.

The optical signal which is transmitted to the optical amplifier 10A is once amplified by the doped fiber 1A under the condition of low excitation. Thereafter, it passes through the optical isolator 6 for use of protection from reflection of ASE (Amplified Spontaneous Emission), and is further amplified by the doped fiber 1B to pass through the dispersion compensator 7. It is very important for this configuration to protect first optical doped fiber from reflection of ASE. So isolation of isolator 6 is preferable to be kept more than 20 dB, and more preferably, to be kept more than 30. In general, the signal loss in the dispersion compensator is large, therefore, there is further provided the doped fiber 1C to amplify the signal again.

Here, the output of the pumping light source 2 is controlled upon a control signal from a supervisor/controller portion 50, which monitors both the incident or input light strength and the main signal strength which has been amplified. Further, the strength of the pumping light is converted into an electric signal in the light detector 32" of the pumping light source 2 and is provided to the supervisor/controller portion 50, so as to be monitored thereby. Though the explanation is omitted here from the drawing, however, the temperature of the optical pumping light source 2, etc. is also monitored.

The supervisor/controller portion 50 receives the supervising electric signal which is converted into the electric signal in the above-mentioned O/E converter portion 40 so as to extract the information being attended to the optical transmission equipment itself. This information includes, such as an information of number of wavelength multiplexing, an information instructing change of the amplification factor. Namely, to the supervisor/controller portion 50 are condensed information from equipment in the upper stream, and monitor information of the optical transmission equipment itself, so as to be used for controlling the optical pumping light source 2. Further, the supervisor/controller portion 50 multiplexes the monitor information of the optical transmission equipment itself with the supervising electric signal. This supervising electric signal is converted into the supervising signal in the E/O converter portion 41, and the converted signal is multiplexed in the wavelength with the main signal within the wavelength multiplexer 4' to be sent to the transmission equipment in the down stream.

According to the construction mentioned in the above, since there is provided no such the optical parts, for example the optical isolator or the like, that brings a large signal loss, at the initial stage of the optical amplifier 10A, it is possible to achieve the optical amplifier and the optical transmission (sender) equipment having a low NF therein.

Namely, in the structure of the conventional optical amplifier, the optical isolator is necessary to be provided at the stage in front of the doped fiber, for protecting from returning back of the reflection light caused by the ASE, because of high excitation thereof. However, according to the structure of the present embodiment, even with the doped fiber 1A is under the condition of low excitation, a sufficient gain can be obtained since the incident signal is low in the level thereof. Therefore, if the optical isolator is provided between the highly excited doped fiber 1B and the lowly excited doped fiber 1A, the incident or input signal receives no ill effect on it, in particular, in the NF thereof, since the incident or input signal to the optical isolator is already amplified once.

Also, according to the structure mentioned in the above, the signal loss following with provision of the dispersion compensator 7 can be compensated or supplemented by means of the doped fiber 1C.

Further, with the optical transmission equipment according to the present embodiment, since it includes the supervisor/controller portion 50, it is also possible to receive the information attending to itself, and to send out the information of itself to the equipment in the down stream as well.

The input signal to the doped fiber 1A from the transmission path 20, in the present construction, lies from −30 dBm up to −5 dBm in the signal level thereof, and the doped fiber 1A has a gain of 10 dB in the signal amplification thereof. However, since the isolator is not provided in the stage in front of the optical isolator 1A as mentioned in the above, an attention must be paid to a phenomenon of an oscillation of light. Accordingly, the gain in the signal amplification by the doped fiber 1A is preferable to kept to be equal or less than 30 dB, and more preferably, within a range from 10 dB to 16 dB. In this instance, the doped fiber 1A is sufficient from 3 m to 6 m in the length thereof. Within such the region of the length mentioned above, the NF in the doped fiber itself the can be neglected therefrom.

Further, the gains in the doped fibers 1B and 1C are from 10 dB to 20 dB, respectively, while the lengths are from 10 m to 20 m, respectively.

Here, for the pumping light source can be used a semiconductor laser of wavelength 980 nm, or alternatively, that of wavelength 1,480 nm in place thereof. However, it is more preferable to use the semiconductor laser of wavelength 980 nm for it. This is because the noises generated by the excitation with the pumping light of wavelength of 940 nm is lower than those with the pumping light of wavelength 1,480 nm. Also, the output level of the pumping light is preferable to be from 120 mW to 150 mW, for example.

Moreover, for protecting the doped fiber 1C from the oscillation therein, it is also possible to provide a further optical isolator in series to the dispersion compensator 7. As the dispersion compensator 7 can be applied a dispersion compensating fiber, a Bragg grating, etc., for examples.

Figure 2:
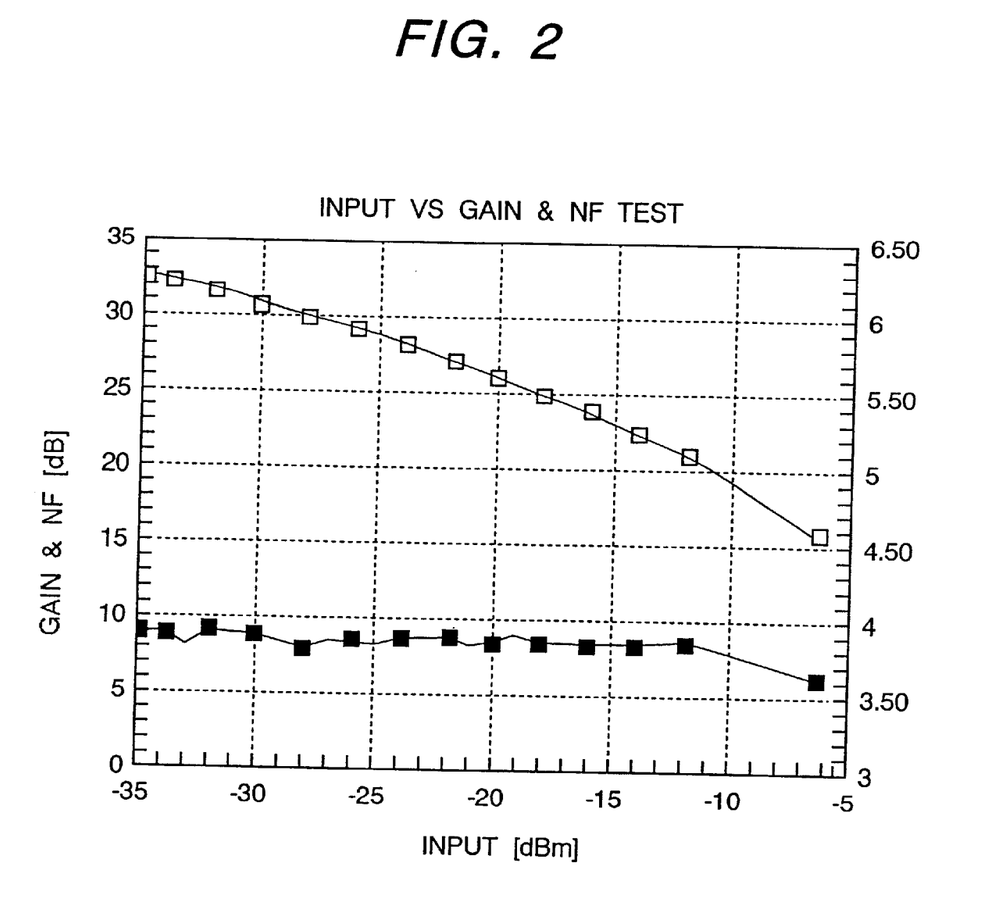
FIG. 2 shows a graph of a measurement result of NF in the optical transmission equipment for use as the repeater, according to an embodiment of the present invention.

A result of measurement on an input/output characteristic and the FN of the optical signal (i.e., input vs. gain & NF test) is shown in FIG. 2, in experiments or tests upon the structure of the optical amplifier according to the present embodiment mentioned above. In particular, FIG. 2 shows the measured values obtained on a system being constructed with the elements from the doped fiber 1A to the doped fiber 1B.

Giving explanation on the points at which the measurement are made in the experiments by referring to FIG. 1, the input (input power) indicates the signal level taken or inputted from the transmission path 20, while the gain on the left-hand vertical scale and the NF on the right-hand vertical scale indicate the measured values from the doped fibers 1A and 1B, respectively, on the system, from the doped fiber 1A to the doped fiber 1B.

From FIG. 2, it is apparent that the NF to the input signal from the transmission path is regulated to be equal to or less than 3.9 dB. Even by taking into the consideration the fluctuation in the temperature on the actual system and also unevenness in the sizes on the production thereof, it is apparent that it can be controlled to be equal to or less than 4.5 dB according to the present invention. Further, by compensating the fluctuation in the temperature and suppressing the unevenness in the sizes of production, it is also possible to keep it to be equal to or less than 4.0 dB.

Comparing to the value in the NF according to the conventional optical transmission equipment, i.e., 7 dB, the improvement at the value 4.0 dB in the NF means, if being converted from the S/N into the signal, that the transmittable distance of the signal can be further extended by about 100 km, thereby obtaining great improvement therewith.

Next, by referring to FIG. 3, an explanation will be given on the values obtained on the system constructed from the doped fiber 1B to the doped fiber 1C, in the tests mentioned above. FIG. 3 shows the result of the gain and the NF (i.e., noise index) measured on the system mentioned above, however inserting the optical attenuator in place of the dispersion compensator, for the purpose of obtaining the effect of bringing the loss in the dispersion compensator variable. The wavelength measured in this test is 1,552 nm, the electric power of the pumping light source 50 mW, and the pumping wavelength 980 nm, respectively.

Figure 3:
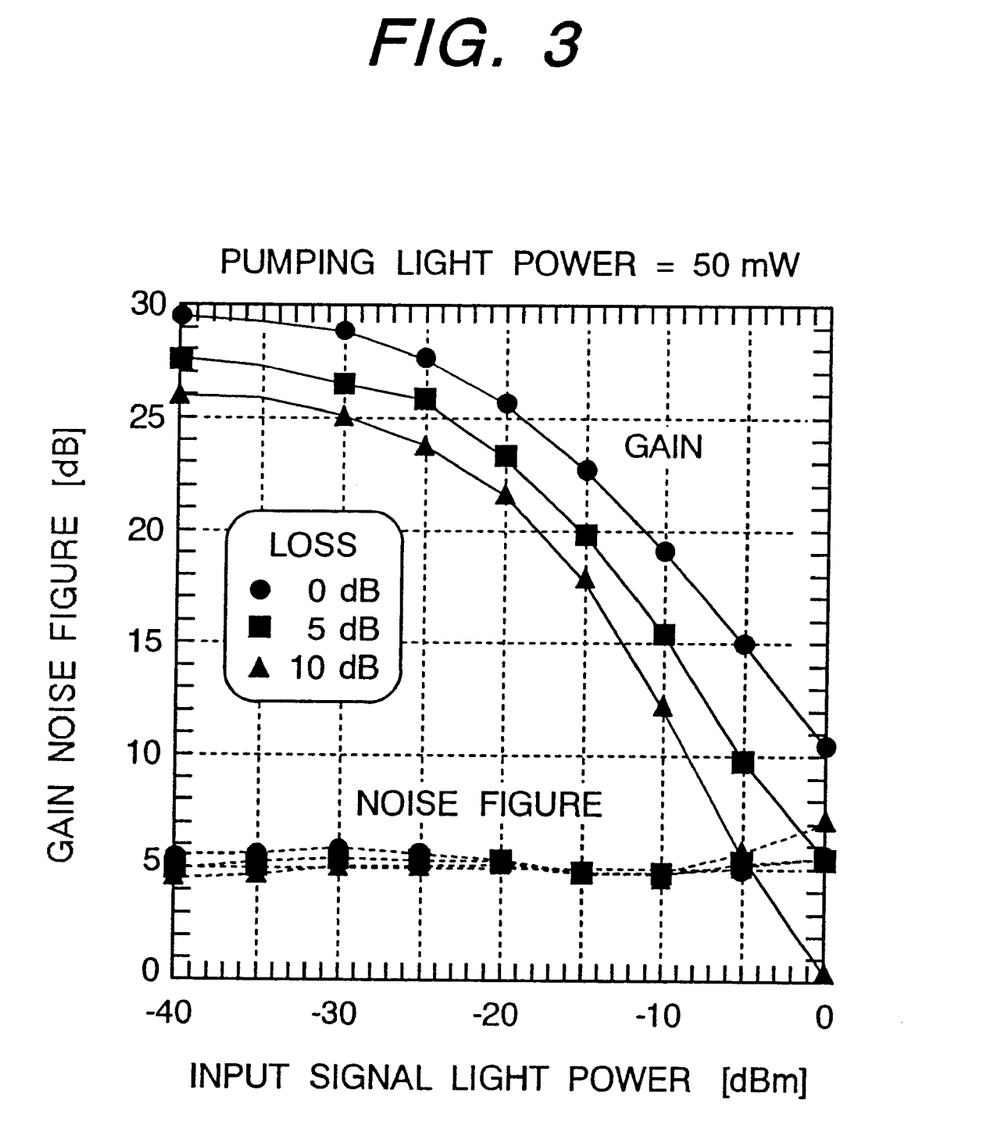
FIG. 3 shows a graph for explaining loss compensation with insertion of an dispersion compensator, in the optical transmission equipment for use as the repeater, according to an embodiment of the present invention.

As is apparent from FIG. 3, in case where the input is equal or less than −20 dB in the signal level thereof, the gain is reduced by 2 dB in the system when the attenuation is set at 5 dB with the attenuator, comparing to that obtained when no attenuation is set. And, also the reduction in the gain by 4 dB is obtained in the system, when the attenuation is set at 10 dB. On a while, though the NF is larger than the measured result shown in FIG. 2 since no positive measure is taken for reducing it in this test, however it is appear that it is almost constant around 5 dB.

Judging from those test results in the above, it is clearly indicated that those embodiments according to the present invention mentioned above have an effect of compensating the losses due to the optical parts, such as the dispersion compensator, etc. Further, it is also clearly indicated that those embodiments according to the present invention do not bring about the increase in the NF.

Next, an explanation will be given on a third embodiment according to the present invention.

Figure 4:
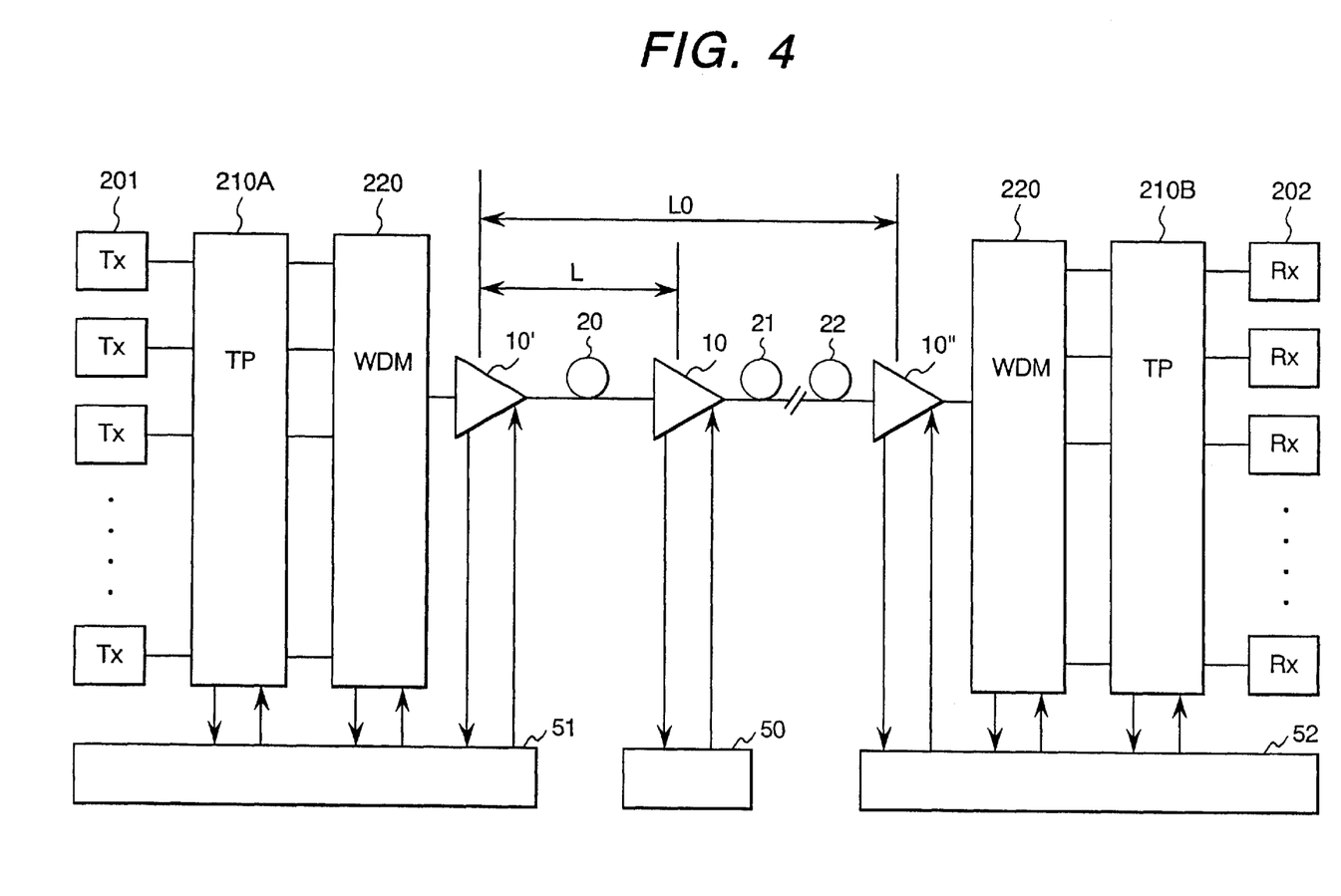
FIG. 4 is a function block diagram of showing an optical transmission system, as a third embodiment according to the present invention.

Referring to FIG. 4 showing the block diagram of an optical transmission system of a wavelength multiplex type, according to the embodiment of the present invention, optical signals of a single wavelength $\lambda 0$ from a plurality of optical transmitters 201 are converted into the plural optical signals of different wavelengths from $\lambda 1$ to $\lambda n$ in a transponder 210A, and are multiplexed in a wavelength multiplexer/de-multiplexer 220. The multiplexed optical signal is, then, amplified with an optical amplifier 10' at a sender side to be sent out onto the transmission path 20. The optical signal which has been damaged within the transmission path is amplified with plural stages of relay or repeat optical amplifiers 10 to be further sent out onto the transmission path 21. Namely, the optical signal is amplified by the optical amplifier 10" at a receiver side after being amplified with the plural stages of the relay or repeat amplifiers, at the number which is regulated under the NF of each optical amplifier, and then is divided or de-multiplexed in the wavelength multiplexer/de-multiplexer 220 with the wavelength thereof. Further, those signals divided or de-multiplexed into the signals from $\lambda 1$ to $\lambda n$ in the wavelength are further converted back into the optical signals of the single wavelength $\lambda 0$ in the transponder 210B to be received by a plurality of optical receivers 202.

In this instance, an information relating to the conversion in the wavelengths (i.e., wavelength conversion information) in the transponder 210A and the wavelength multiplexer/de-multiplexer 220 at the sender side, is controlled by a supervisor/controller portion 51, and is multiplexed with the main signal, on an output of the optical sender amplifier 10' at the receiver side, as the supervising signal. An optical repeater amplifier 10, as explained in FIG. 1, divides the supervising signal from it at the entrance thereof, and the signal is multiplexed with the main signal at the exit thereof, after being reproduced and amplified. While, the supervising signal divided at the input of the optical receiver amplifier 10" is terminated with the wavelength conversion information thereof in the supervisor/controller portion 52, then correspondences are made between the respective optical signals and the optical receivers onto which they are to be transmitted, by controlling the operations of the wavelength multiplexer/demultiplexer 220B and the transponder 210 at the transmitter side.

The transmission distance L between the optical amplifiers is determined mainly depending upon the loss in the optical signal on the transmission path. However, a maximum regenerative relay or repeat distance L0, i.e., the maximum distance at which the optical signal can be transmitted only by the optical amplification by means of the optical amplifier differs greatly depending upon the NF of the optical amplifier. Namely, the number of the stages of relays or repeaters with the optical amplifiers having the low NF comes to be larger than that with the optical amplifiers having the high NF, therefore, the maximum distance L0 can be extended by a value making the distance L between the optical transmitters as a unit thereof.

Next, an explanation will be given on the optical transmission apparatus 100 including an another optical amplifier 10B therein, according to the present invention, by referring to FIG. 5.

Figure 5:
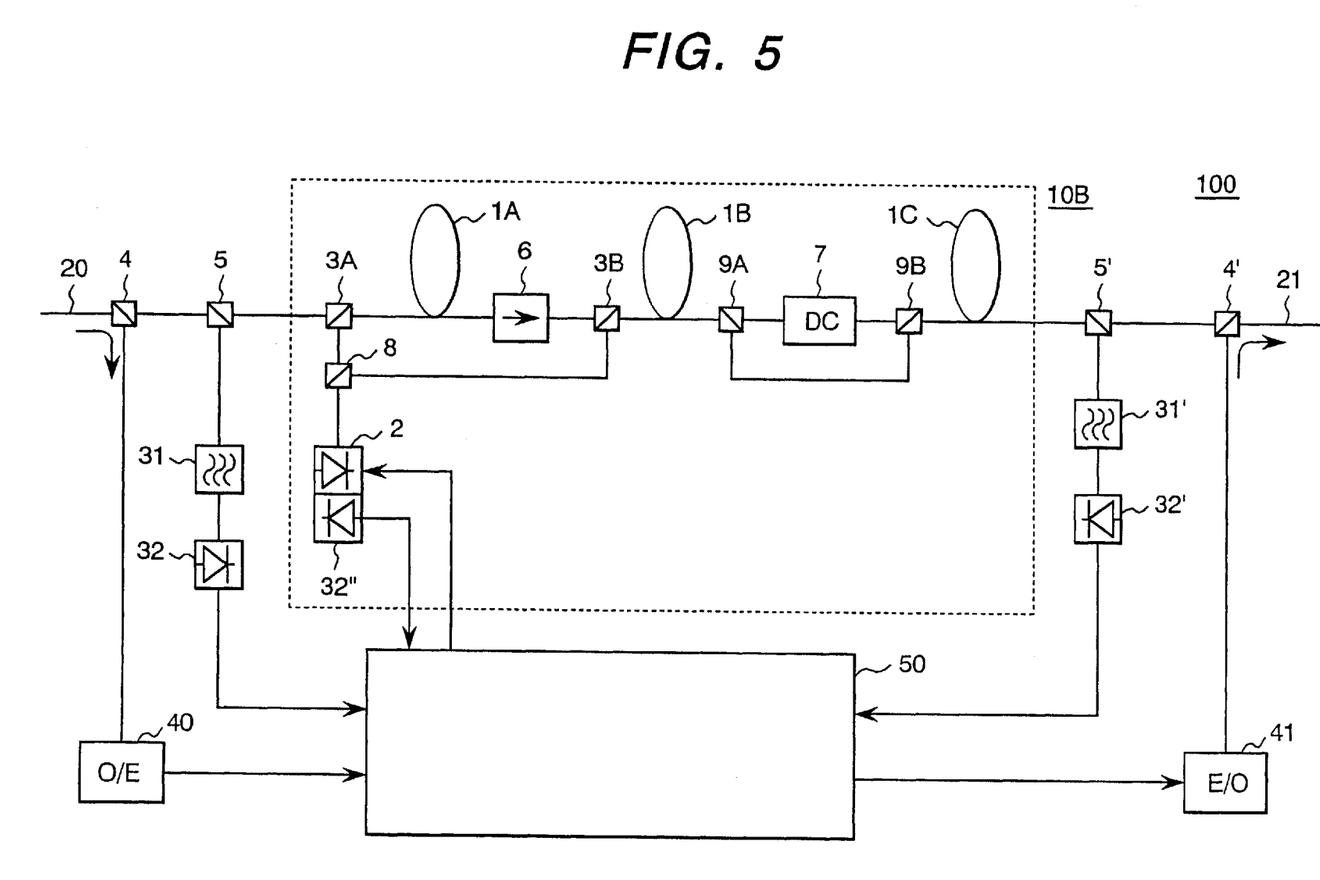
FIG. 5 is a function block diagram of showing an another embodiment of the optical amplifier for use as the repeater in the optical transmission equipment, according to the present invention.

In FIG. 5 showing the block diagram of the transmission equipment 100 for use as the relay or repeater according to this another embodiment, since all of the elements except for the optical amplifier 10B are same in the structure thereof, the explanation on the structure and function of the transmission equipment is omitted here.

As is apparent from the present embodiment, the optical amplifier 1OB also includes the doped fiber portion 1 of three (3) stages of doped fibers 1A, 1B and 1C, each being dopes with rear earth, the pumping light source 2 with the light detector 32" thereof, the optical isolator 6, and the dispersion compensator 7 therein. In the construction, the pumping light from the pumping light source 2 is also divided by the coupler 8 at the ratio 8:2 (i.e., a 8:2 coupler), and the small portion of the pumping light at the ratio 2 is introduced through the wavelength multiplexer 3A into the doped fibers 1A for pumping thereof. However, the large portion of the pumping light at the ratio 8, in this another embodiment, is introduced through the wavelength multiplexers 3B into the doped fiber 1B for excitation thereof. And, in the present variation, the length of the doped fiber 1B and the pumping light at the ratio 8 are so designed or selected that the pumping light is in excess therein. Therefore, the pumping light in excess, passing through the doped fiber 1B and then bypassing the dispersion compensator 7 at a pair of wavelength multiplexer/demultiplexers 9A and 9B connected thereacross, is introduced into the doped fiber 1C for excitation thereof.

In this construction, the optical signal to be transmitted to the optical amplifier 10B is amplified with the doped fiber 1A under the condition of low excitation, once. After that, it passes through the optical isolator 6 for the protection from the reflection of ASE. The optical signal is, further, amplified with the doped fiber 1B and passes the dispersion compensator 7. Also in this variation, since the signal loss is generally large in the dispersion compensator 7, the optical signal is further amplified with the doped fiber 1C.

And, according to this embodiment, the optical amplifier in the optical transmission equipment can also obtain the same effects as be obtained with the embodiment in FIG. 1 mentioned above, by paying the attention which was already given previously.

Next, an explanation will be given on the optical transmission apparatus 100 including an other optical amplifier 10C therein, according to the present invention, by referring to FIG. 6.

Figure 6:
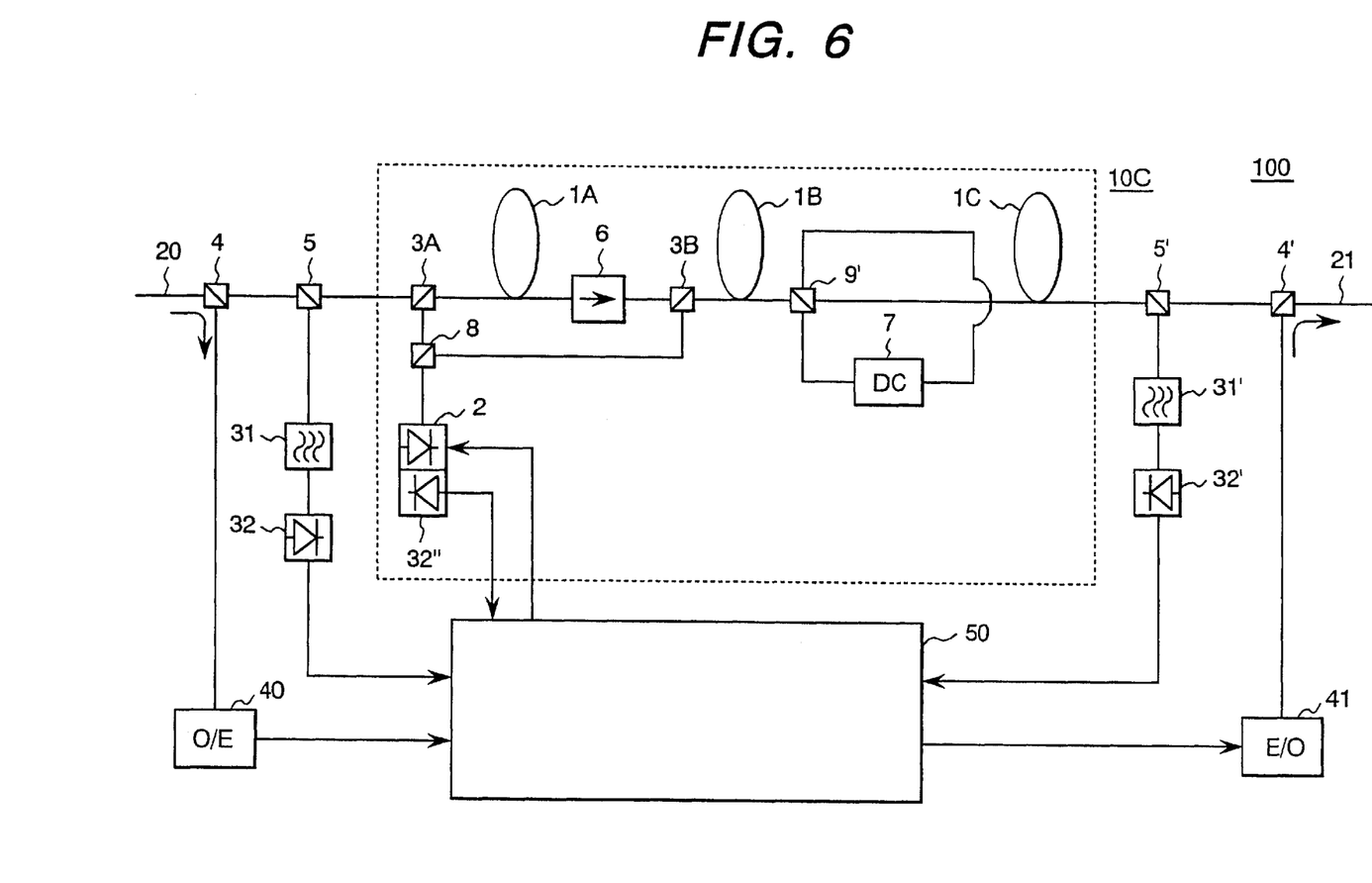
FIG. 6 is a function block diagram of showing other embodiment of the optical amplifier for use as the repeater in the optical transmission equipment, according to the present invention.

In FIG. 6 showing the block diagram of the transmission equipment 100 for use as the relay or repeater according to this other embodiment, since all of the elements except for the optical amplifier 10C are same in the structure thereof, therefore the explanation on the structure and function of the transmission equipment is omitted here.

In the present other embodiment, the optical amplifier 10C also includes the doped fiber portion 1 of three (3) stages of doped fibers 1A, 1B and 1C, each being dopes with rear earth, the pumping light source 2 with the light detector 32" thereof, the optical isolator 6, and the dispersion compensator 7 therein. In the construction, the pumping light from the pumping light source 2 is also divided by the optical coupler 8 at the ratio 8:2 (i.e., a 8:2 coupler 8), and the small portion of the pumping light at the ratio 2 is introduced through the wavelength multiplexer 3A into the doped fibers 1A for pumping thereof. While, the large portion of the pumping light at the ratio 8, in this variation, is introduced through the wavelength multiplexers 3B into the doped fiber 1B for excitation thereof. And, in the present other embodiment, the length of the doped fiber 1B and the pumping light at the ratio 8 are also so combined and designed that the pumping light is in excess therein. Therefore, the pumping light in excess, after passing through the doped fiber 1B, further passes through the wavelength multiplexer/de-multiplexer 9' to be introduced into the doped fiber 1C for excitation thereof.

The optical signal to be transmitted to the optical amplifier 10C is amplified with the doped fiber 1A under the condition of low excitation, once. After that, it passes through the optical isolator 6 for the protection from reflection of ASE. The optical signal is, further, amplified with the doped fiber 1B and is divided with the wavelength thereof at the wavelength multiplexer/de-multiplexer 9' once, and it passes through the dispersion compensator 7. And in this other embodiment, since the signal loss is generally large in the dispersion compensator 7, the optical signal brings about the signal loss therein. The optical signal damaged with the loss is turned back to the wavelength multiplexer/de-multiplexer 9', and is multiplexed in wavelength with the pumping light so as to amplify the signal in the doped fiber 1C.

According to the other embodiment, the optical amplifier in the optical transmission equipment can also obtain the same effects as be obtained with the embodiment in FIG. 1 mentioned above, by paying the attention which was already given previously.

Next, an explanation will be given on a further other embodiment of the transmission equipment 100 including the optical amplifier 10C therein, according to the present invention, by referring to FIG. 7.

Figure 7:
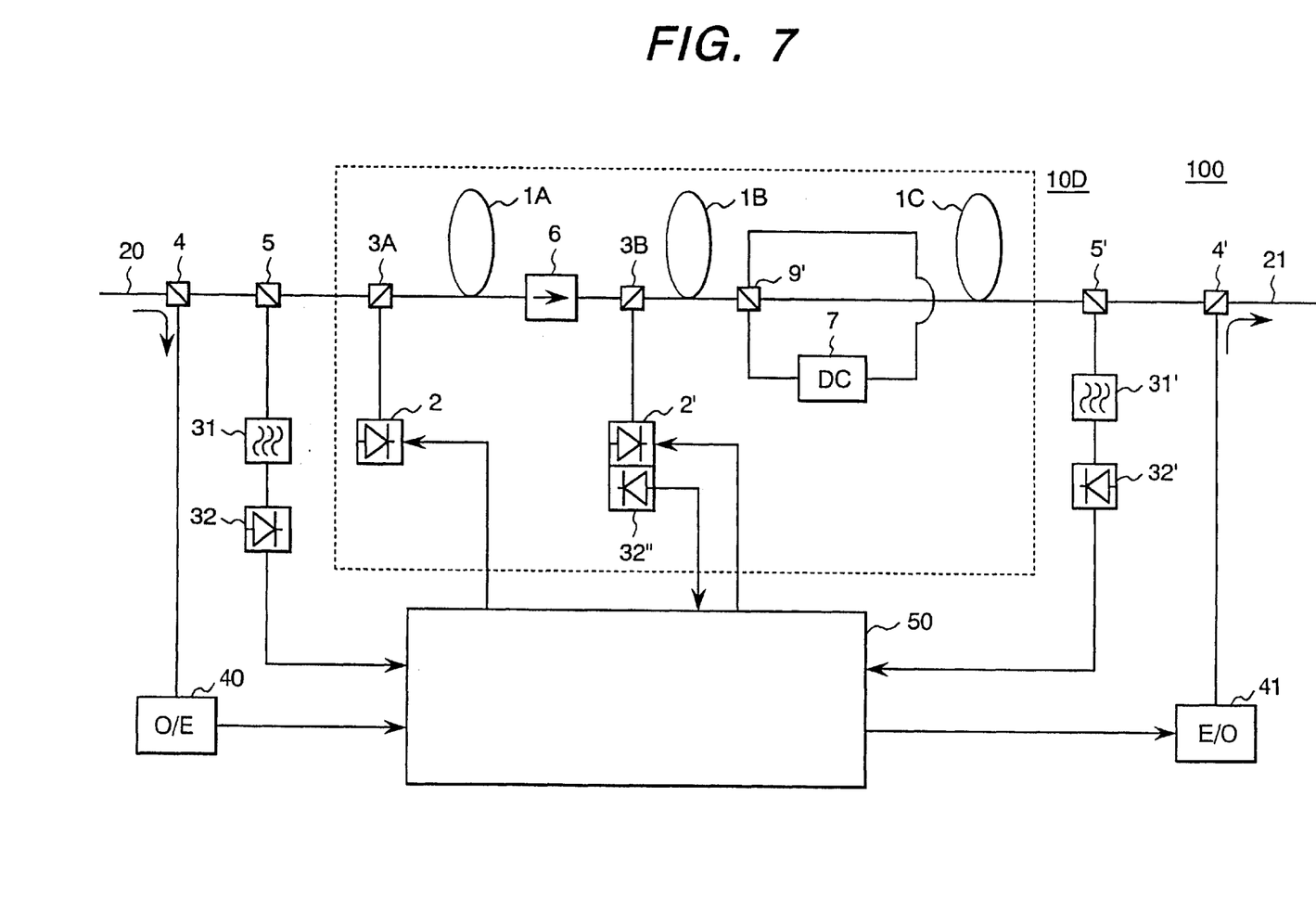
FIG. 7 a function block diagram of showing further other embodiment of the optical amplifier for use as the repeater in the optical transmission equipment, according to the present invention.

In FIG. 7 showing the block diagram of the transmission equipment 100 for use as the relay or repeater, since all of the elements except for the optical amplifier 10D are same in the structure thereof, therefore the explanation on the structure and function of the transmission equipment is also omitted here.

In the present further other embodiment, the optical amplifier 10D also includes the doped fiber portion 1 of three (3) stages of doped fibers 1A, 1B and 1C, each being dopes with rear earth, the pumping light source 2 and the other pumping light source 2' with the light detector 32" thereof, the optical isolator 6, and the dispersion compensator 7 therein. In the construction, the pumping light from the pumping light source 2 excites the doped fiber 1A through the wavelength multiplexer 3A. While, the pumping light from the other pumping light source 2' excites the doped fiber 1B through the wavelength multiplexer 3B. Also, in the present further other embodiment, the length of the doped fiber 1B and the pumping light from the other pumping light source 2' are also so combined and designed that the pumping light is in excess therein. Therefore, the pumping light in excess can pass through the wavelength multiplexer/de-multiplexer 9', so as to excite the doped fiber 1C too.

The optical signal to be transmitted to the optical amplifier 10D is amplified with the doped fiber 1A under the condition of low excitation, once. After that, it passes through the passes through the optical isolator 6 for the protection from the reflection of ASE. Further, it is amplified with the doped fiber 1B, and then is divided in the wavelength thereof at the wavelength multiplexer/de-multiplexer 9' once, and further passes through the dispersion compensator 7. And in this further other embodiment, since the signal loss is also generally large in the dispersion compensator 7, the optical signal brings about the signal loss therein. The optical signal damaged with the loss is turned back to the wavelength multiplexer/de-multiplexer 9', and is multiplexed in wavelength with the pumping light so as to amplify the signal in the doped fiber 1D.

Here, the output of the other pumping light source 2' is controlled by a control signal from the supervisor/controller portion 50 which monitors the strengths in the input light and the amplified main signal. Further, the strength in the pumping light is converted into the electric signal by the light detector 32" of the other pumping light source 2', thereby being monitored also by the supervisor/controller portion 50.

In this further other embodiment, differing from the various embodiments mentioned in the above, there are contained two set of the excitation light sources. However, since the pumping light source from 30 mW to 50 mW in the power thereof is enough for use for pumping the doped fiber 1A of the low excitation type, therefore it is cheap in the price.

Also, according to this further other embodiment, the optical amplifier in the optical transmission equipment can also obtain the same effects as be obtained with the embodiment in FIG. 1 mentioned above, by paying the attention which was already given previously.

In the further other embodiment, as was mentioned, the doped fiber of three stages is excited by the two set of the pumping light sources. However, the present invention should not be limited only to the embodiments mentioned in the above. For example, it is further possible to excite or pump the doped fibers 1A and 1B by means of one set of the pumping light source, as well as to make the doped fiber 1C as a single pumping light source. In this instance, it is preferable to use the pumping light of the wavelengths 980 nm for pumping the doped fibers 1A and 1B. Though not only the pumping light of the wavelengths 980 nm but also of 1,480 nm can be used, and it is possible to obtain a high output by selecting the pumping light to be 1,480 nm in the wavelength thereof.

In all of those embodiments mentioned in the above, the relationship between the doped fibers and the pumping light source(s) is not restricted with the construction shown in the figures. Namely, it may be constructed with a front excitation method in which the signal and the excitation light are in the same direction, or with a rear excitation method in which the signal and the excitation light are reversed in the directions thereof, or with a method of exciting in both directions.

Further, according to the present invention, it is also possible to provide the optical amplifier and the optical transmission equipment by using thereof, with which the high speed optical signal can be amplified with a cheap price and a low NF can be obtained. Furthermore, it is also possible to provide the optical transmission system enabling the long distance transmission.

What is claimed is:

1. An optical transmission equipment for transmitting an optical signal from an equipment in an upper stream to an equipment in a down stream, comprising:

an optical amplifier portion for amplifying the transmitted optical signal for transmission thereof; and a supervisor/controller portion for receiving information from the equipment in the upper stream and for sending information including that of the optical transmission equipment to the equipment in the down stream, wherein said optical amplifier portion comprises:
   a first optical doped fiber,
   a second optical doped fiber,
   a third optical doped fiber, and
   a pumping light source for pumping at least two optical doped fibers in common among said first, second and third optical doped fibers.

2. An optical transmission equipment as defined in claim 1, wherein said pumping light source of said optical amplifier portion is optically connected so that said second and third optical doped fibers are excited in common.

3. An optical transmission equipment as defined in claim 1, wherein length of said first optical doped fiber is shorter than that of both of said second and third optical doped fibers.

4. An optical transmission system for transmitting an optical signal, comprising:

an optical sender for sending an optical signal converted from an electric signal onto a transmission path;

an optical transmission equipment for receiving the optical signal being attenuated on said transmission path; and an optical receiver for receiving the optical signal from said optical transmission equipment to convert said optical signal into an electric signal, wherein said optical transmission equipment includes an optical amplifier portion comprising:
   a first optical doped fiber,
   a second optical doped fiber,
   a third optical doped fiber, and
   a pumping light source for pumping at least two optical doped fibers in common among said first, second and third optical doped fibers.

5. An optical transmission system as defined in claim 4, wherein said pumping light source of said optical amplifier portion is optically connected so that said second and third optical doped fibers are excited in common.

6. An optical transmission system as defined in claim 4, wherein a length of said first optical doped fiber is shorter than that of both of said second and third optical doped fibers.

7. An optical amplifier for use in an optical transmission equipment, comprising:

a first optical doped fiber;
   a second optical doped fiber;
   a third optical doped fiber; and
   a pumping light source for pumping, said pumping light source being optically connected so that at least two optical doped fibers are excited in common among said first, second and third optical doped fibers.

8. An optical amplifier as defined in claim 7, wherein said pumping light source is optically connected so that said second and third optical doped fibers are excited in common.

9. An optical amplifier as defined in claim 7, wherein length of said first optical doped fiber is shorter than that of both of said second and third optical doped fibers.

* * * * *